United States Patent [19]
Herman et al.

[11] 3,847,807
[45] Nov. 12, 1974

[54] REMOVAL OF CYANIDE AND COLOR BODIES FROM COKE PLANT WASTEWATER

[75] Inventors: Stewart T. Herman, Hellertown; Russel J. Horst, Bethlehem, both of Pa.

[73] Assignee: Bethlehem Steel Corporation, Bethlehem, Pa.

[22] Filed: Mar. 21, 1973

[21] Appl. No.: 343,598

[52] U.S. Cl. .................. 210/46, 210/51, 423/143
[51] Int. Cl. ...................... C02b 1/30, C02c 5/02
[58] Field of Search ............ 210/47, 42, 50, 51, 45, 210/49, 46, 52, 61; 423/236, 140, 163, 367

[56] References Cited
UNITED STATES PATENTS
3,736,239  5/1973  George et al. .................. 423/143
3,738,932  6/1973  Kostenbader .................... 210/50
3,617,559  11/1971  Cywin ............................. 210/50

Primary Examiner—Thomas G. Wyse
Assistant Examiner—Benoit Castel
Attorney, Agent, or Firm—Joseph J. O'Keefe; Charles A. Wilkinson; John S. Simitz

[57] ABSTRACT

Wastewaters, from a coke oven by-product plant, containing cyanides and objectionable complex organic compounds are treated by a high density sludge process. The wastewaters are mixed with an aqueous high calcium lime slurry and a portion of the sludge formed in the process, which portion is recycled in the process. The aqueous high calcium lime slurry and the portion of recycled sludge are mixed for a time to obtain a uniform mix. A solution containing iron values is added to the uniform mix. Iron cyanide compounds and a portion of the complex organic compounds are precipitated. The precipitate is flocculated and is passed to a settling tank wherein the precipitate settles out to form a high density sludge.

3 Claims, 1 Drawing Figure

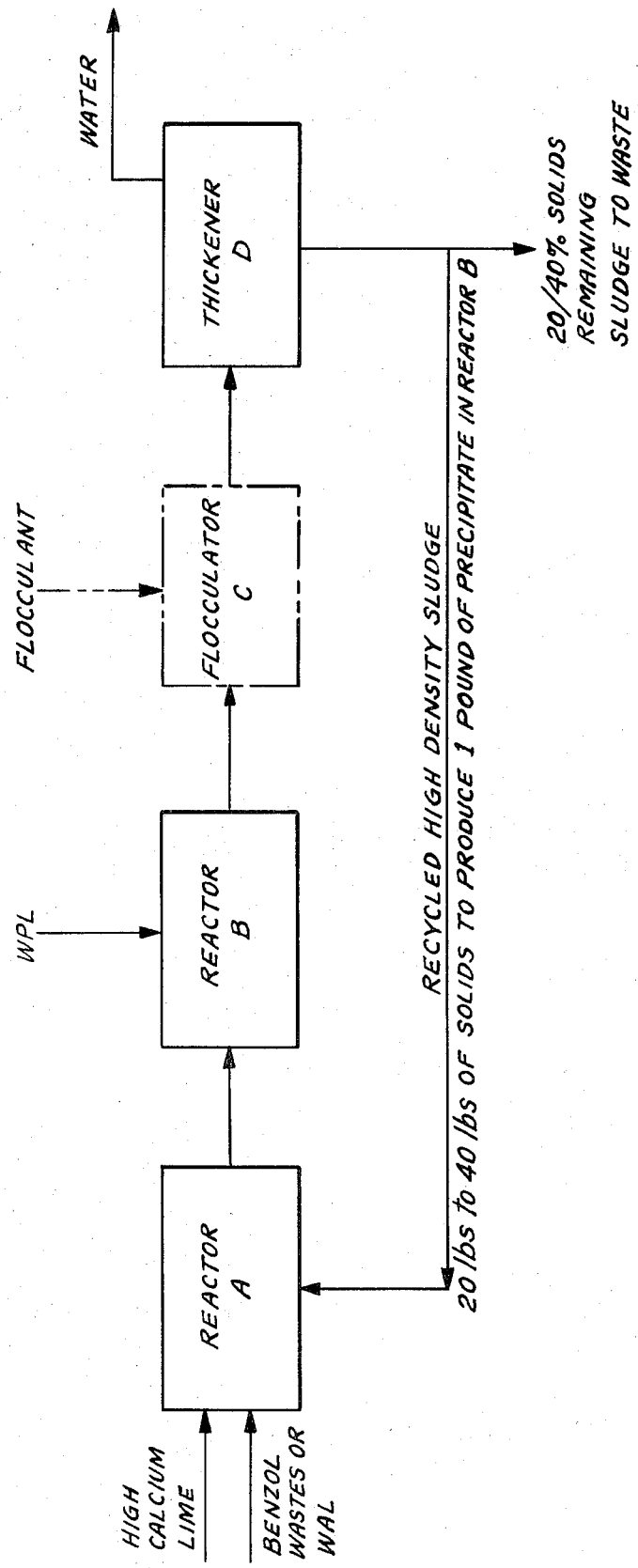

REMOVAL OF CYANIDE AND COLOR BODIES FROM COKE PLANT WASTEWATER

BACKGROUND OF THE INVENTION

This invention is directed to the use of an improved high density sludge process for removing a substantial portion, if not all, of the cyanides and complex organic compounds contained in coke oven by-product plant wastewaters, such as the waste liquor from ammonia stills, benzol wastes and the like.

Coke oven gases contain noxious compounds such as $H_2S$, HCN, HCNS, $C_5H_5N$ (pyridine), $NH_3$ and the like. The coke oven gases are scrubbed with liquids, such as waste ammonia liquor, to remove a substantial portion of such compounds from the coke oven gases. Many of the compounds which are stripped from the coke oven gases can be stripped from the wastewaters thus formed, rather easily. However, the wastewaters, such as waste liquor from the ammonia still, benzol wastes and scrubbing liquids, contain relatively large concentrations of various cyanide compounds, both complex and simple, and complex organic compounds which discolor the wastewaters. Obviously, these types of wastewaters cannot be disposed of by conventional means, for example, by discharging the untreated wastewaters into environmental surface or ground waters. It is, therefore, necessary to reduce the cyanide content to a level which is not harmful to plant, animal or human life, and the objectionable color in the wastewaters to an acceptable color prior to disposal thereof.

Several methods have been devised to remove compounds such as $NH_3$, HCN and the like from coke oven gas as exemplified in U.S. Pat. No. 2,584,280 issued Feb. 5, 1952 to Herman P. Meissner et al. and U.S. Pat. No. 2,712,980 issued July 12, 1950 to Richard D. Hoak.

The prior art methods are designed to wash coke oven gas with waste pickle liquor to remove ammonia, $H_2S$ and HCN from the coke oven gases. The ferrous sulfide and ammonium-ferro-cyanide formed are insoluble and are disposed of by burning in a blast furnace. The processes are complex, expensive and utilize high speed centrifuges or a filter apparatus to remove the cyanide sludges from the ammonium sulfate containing liquid. While the processes may remove some of the complex organic compounds, they are not designed to remove cyanides nor sufficient amounts of the complex organic compounds to thereby effectively reduce the discoloration of the wastewater sufficiently to allow disposal of same in environmental surface waters.

Systems for neutralization of acid wastewaters, such as waste pickle liquor, acid mine drainage and the like, have been devised as exemplified in U.S. Pat. No. 3,617,559 issued Nov. 2, 1971 to Allen Cywin. While these systems have proven relatively effective in reducing the acidity and removing iron from acid wastewaters, they are generally not effective in treating non-acid liquors, such as benzol wastes and waste liquor from ammonia stills in coke oven by-product plant recovery systems.

A high density sludge process as disclosed in U.S. application Ser. No. 135,292 filed Apr. 19, 1971 to Paul Kostenbader now U.S. Pat. No. 3,738,932, titled "Method for Treating Acid Water Containing Metallic Values," which utilizes a high calcium lime slurry mixed with a portion of sludge formed in the process, which portion is recycled in the process to remove iron values from waste pickle liquor or acid mine drainage waters, is in use. However, the process has not been adapted to the removal of cyanides or complex organic compounds or color bodies present in coke oven by-product plant wastewaters.

It is the object of this invention to use an inexpensive improved high density sludge process for removing a substantial portion of the cyanides and complex organic compounds responsible for discoloration of the wastewaters from coke oven by-product plants.

It is another object of this invention to use an improved high density sludge process wherein waste products, for example, waste pickle liquor containing iron values, are charged to a reactor to provide iron values to precipitate a substantial portion, if not all, the cyanides contained therein as iron cyanides.

SUMMARY OF THE INVENTION

Broadly, this invention is an improved high density sludge process for treating wastewaters containing cyanides and complex organic compounds, which complex organic compounds discolor the wastewaters. We have discovered that if a mix of a slurry of a neutralizing agent, the wastewaters to be purified and a recycled portion of the high density sludge formed in the process, are mixed in a first reactor and then passed to a second reactor where a waste product containing iron values is added to precipitate iron cyanides, followed by flocculating and settling in a thickener or the like, a very effective separation of cyanides and complex color producing organic compounds from the wastewaters can be effected. A substantial portion of the iron values in the waste product reacts with the cyanides in the wastewaters and is precipitated as iron cyanide compounds. A high density sludge is formed. A substantial portion, if not all, of the cyanides and complex organic compounds can be effectively removed from the wastewaters as a high density sludge.

DESCRIPTION OF THE DRAWING

The Drawing is a block diagram of the process of the invention showing the steps of the invention.

PREFERRED EMBODIMENT OF THE INVENTION

We have found that a substantial portion of cyanides, such as HCN and the like, and complex organic compounds which discolor wastewaters, such as waste liquor from ammonia stills, benzol wastes, bio-effluent from an activated sludge plant and the like, can be removed from said wastewaters by the use of an improved high density sludge process.

Waste aqueous liquors from ammonia stills and benzol wastes can contain about 60 ppm and 20 ppm of cyanides, such as HCN, respectively, and can also contain complex organic compounds in sufficient amounts to seriously discolor the wastewaters. The waste liquor from the ammonia stills and the benzol wastes can typically have a color rating of 1,000 APHA units and 100 APHA units, respectively. The APHA color number is an arbitrary figure assigned by the American Public Health Association Inc. and is indicative of the color and the density of the color in the wastewaters. The test procedure for determining the APHA unit of wastewaters is discussed in "Standard Methods for the Examination of Water and Wastewater," 13th Edition, American Public Health Association, American Waterworks Association, Water Pollution Control Federation, page 160. While the amount of cyanide or color bodies allowable in any wastewaters which are disposed of in environmental surface waters is not fixed by law, guidelines have been established for given situations.

Turning now to the drawing, the waste liquor from ammonia stills or benzol wastes are mixed with an aqueous high calcium lime slurry containing about 1 percent to about 10 percent lime in a first reactor A. A portion of the high density sludge formed in the process which settles out in a clarifying means, such as a settling tank or thickener D, is recycled from the clarifying means to reactor A. The recycled portion of the high density sludge is mixed with the aqueous high calcium lime slurry and wastewaters, such as waste liquor from the ammonia stills or benzol wastes and the like, in reactor A. The materials are stirred for a time, for example, about 1 minute to about 25 minutes, to produce a uniform mix and to cause intimate contact between the particles in the materials. At this stage of the process, the mix is high in high calcium lime values and has a pH of about 11. The mix in reactor A contains iron values derived from the recycled portion of the high density sludge. In this specification, high calcium lime is a lime made from limestone which contains less than 5 percent magnesium carbonate.

After thorough mixing, the mixed materials either flow under the influence of gravity or are pumped to a second reactor B. Waste pickle liquor or an acid mine drainage liquid containing substantially all ferrous iron values, but which an contain a small portion of ferric iron values, is added to the materials in reactor B. The iron values contained in the waste pickle liquor or acid mine drainage liquid provides sufficient iron to precipitate a substantial portion, if not all, of the cyanides as iron cyanides. It has been found that as much as 99 percent of the cyanides, and at least 90 percent of the cyanides, in the original wastewaters entering reactor A will be precipitated in reactor B as iron cyanides. It is not known how the pH of the mixture and the iron values supplied by the waste pickle liquor or the acid mine drainage influence the complex organic compounds responsible for the discoloration of the wastewaters. However, it has been found that a sufficient amount of the complex organic compounds which are responsible for the discoloration of the wastewaters, such as waste liquor from ammonia stills, benzol wastewaters, or bio-effluent from an activated sludge plant and the like, is also precipitated in reactor B to thereby reduce the color of the wastewaters to below at least about 200 and 50 APHA units, respectively. Bio-effluent may be defined as the water discharged from an activated sludge plant.

The main objectives for operating an activated sludge plant are (1) to remove phenol from wastewaters such as ammonia still waste and (2) to reduce the oxygen demand (BOD or bio-chemical oxygen demand) of the wastewaters. The activated sludge process accomplishes these objectives by utilizing microorganisms which are sustained by aeration and the addition of nutrients such as phosphate. Ammonia still waste and de-oiled benzol waste are treated in an activated sludge plant (also called bio-oxidation plant). The bio-effluent from the activated sludge plant can be treated in our modified high density sludge plant for the removal of cyanides and color.

It has been found that the slurry mixture which is passed from reactor A to reactor B should have a pH of between 10 and 12 so that when waste pickle liquor or acid mine drainage is added to the slurry in reactor B, the resultant slurry mixture will have a pH of between 9 and 10. A pH of between 9 and 10 is preferred for maximum cyanides removal but the pH can be as low as 8 to 9 if the slurry in reactor B is aerated.

The solution containing the iron values can be waste pickle liquor, or acid mine drainage and the like as noted previously. Acid mine drainage containing as little as 0.02 percent iron as ferrous iron and waste pickle liquor containing as much as 8.0 percent total iron can be used in the method to precipitate the cyanide compounds as iron cyanides and remove complex organic compounds but we prefer to use a solution containing between 4.0 percent and 8.0 percent iron. A typical waste pickle liquor composition (on a weight basis) follows:

| | |
|---|---|
| Fe, Total | 7.5% |
| Fe, Ferrous | 7.1% |
| $H_2SO_4$ | 1.0% |
| Mn | 0.09% |
| Cr | 0.05% |
| Ni | 0.03% |

The precipitate and liquid in reactor B are pumped or flow by gravity to a flocculator C wherein the particles in the effluent are flocculated into particles sufficiently large and dense to readily settle from the effluent in the thickener D. Any well known flocculant, such as Magnifloc 837A and the like, can be added in the flocculator to aid in flocculating the precipitate.

The flocculated material is passed, usually by gravity flow, to a clarifying means such as a thickener D wherein the dense particles of the precipitate settle out to form a high density sludge which settles to the bottom of the tank. Dependent upon the wastewater treated, the amount of cyanide and the color APHA Units of the clarified water will vary. A comparison of the wastewaters treated by the high density sludge process and the effectiveness of the treatment is shown in the examples below:

| Wastewater Treated | Before Treatment | | After Treatment | |
|---|---|---|---|---|
| | CN Content PPM | Color from Organic Compounds in APHA Units | CN Content PPM | Color from Organic Compounds in APHA Units |
| Bio-effluent | 6 | 200 ± | 0.2 | 50 |
| Benzol Waste | 20 | 200 ± | 1 | 5 |
| Still Waste | 10 | 1000–2000 | 3 | 200 |
| 60% Weak Ammonia Liquor and 10% Benzol Waste | 30 | 200–2000 | 3 | 200 |

Note: The color of bio-effluent and benzol waste are difficult to measure because of the small size of the particles that must be filtered out. The color of the still waste and the weak ammonia liquor mixture depends on its exposure to oxygen and aging.

The amount of high density sludge recycled from the thickener to reactor A should be in a ratio of not less than from about 20 pounds of solids recycled from thickener D per 1 pound of solids precipitated in reactor B to about 40 pounds of solids recycled from thickener D per 1 pound of solids precipitated in reactor B, i.e., 20 pounds to 40 pounds recycled high density sludge added in reactor A to every 1 pound of precipitate formed in reactor B. The amount of solids precipitated in reactor B may be found by subtracting the amount of solids on a dry basis entering reactor B from the amount of solids leaving reactor B. The resulting figure is then compared with the amount of solids recycled to reactor A.

In a specific example of the invention, 12 gallons per minute of a high calcium lime slurry of about 6 percent by weight high calcium lime was mixed in a reactor A with 130 gallons per minute of benzol waste waters containing 20 ppm HCN. About 170 gallons per minute of high density sludge formed in a thickener D was recycled to reactor A. The three materials were mixed together in reactor A for about three minutes. The mixture was then passed by gravity feed to a reactor B. (Reactor A was arranged to be at a slightly higher elevation than reactor B.) About 10 gallons per minute of waste pickle liquor containing 5 percent by weight iron (as sulfate) were added to reactor B. A precipitate which settled to form a sludge in the thickener D containing 28 percent solids was formed in reactor B. The material from reactor B was passed by gravity to a flocculator C (positioned at a slightly lower elevation than reactor B). About 2.5 gallons per minute of a commercial flocculant, Magnifloc 837 A, was added to the flocculator C. The flocculated material was then passed by gravity feed to a thickener D and the precipitate was allowed to settle-out in thickener D to form a high density sludge. About 135 gallons per minute of water containing less than 1 ppm cyanides and having a color of 5 APHA units were decanted from the thickener. The water decanted from the thickener was passed to environmental surface waters. Of course, the decanted water could be used in other processes. High density sludge in an amount of 5.8 gallons per minute was removed from the bottom of the thickener. The high density sludge contained about 28 percent solids. The ratio of sludge recycled to reactor A to the material precipitated in reactor B was 29 pounds of recycled sludge to 1 pound of precipitate.

We claim:

1. A process for removing cyanides and complex organic compounds which color liquid wastes from coke oven wastewaters, comprising:
   a. mixing high calcium lime, the wastewater to be purified and a major portion of the high density sludge formed in step (e) in a first reactor forming a first mix having a pH of between about 10.0 to about 12.0,
   b. transferring the first mix from the said first reactor to a second reactor,
   c. mixing a solution selected from the group consisting of acid mine drainage and waste pickle liquor, which solution contains iron values into the first mix in the second reactor to form a second mix having a pH of between about 9.0 to about 10.0 and precipitating a major portion of the cyanides and complex organic compounds originally present in the wastewater being purified,
   d. flocculating the precipitate formed in step (c),
   e. passing the second mix containing flocculated precipitate of step (d) to a settling means wherein the flocculated precipitate settles out as a high density sludge and clarified water is decanted from the settling means, and
   f. recycling back to the first reactor from about 20 pounds to 40 pounds of the high density sludge formed in step (e) for every pound of new precipitate formed in step (c).

2. The process of claim 1 in which the solution containing iron values added in step (c) is acid mine drainage.

3. The process of claim 1 in which the solution containing iron values added in step (c) is waste pickle liquor.

* * * * *